(12) United States Patent
Miyoshi

(10) Patent No.: US 8,800,615 B2
(45) Date of Patent: Aug. 12, 2014

(54) RUBBER COMPOSITION AND PNEUMATIC TIRE USING THE SAME

(75) Inventor: Masaki Miyoshi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 438 days.

(21) Appl. No.: 11/908,462

(22) PCT Filed: Feb. 13, 2006

(86) PCT No.: PCT/JP2006/302460
§ 371 (c)(1),
(2), (4) Date: Sep. 12, 2007

(87) PCT Pub. No.: WO2006/098103
PCT Pub. Date: Sep. 21, 2006

(65) Prior Publication Data
US 2009/0054549 A1    Feb. 26, 2009

(30) Foreign Application Priority Data
Mar. 14, 2005   (JP) ................. 2005-070644

(51) Int. Cl.
*B60C 11/00*    (2006.01)
*C08L 9/06*    (2006.01)
*C08K 3/36*    (2006.01)

(52) U.S. Cl.
USPC ........ 152/209.1; 523/152; 524/526; 524/575; 524/575.5

(58) Field of Classification Search
USPC ................. 524/526, 575; 523/152; 152/209.1
See application file for complete search history.

(56) References Cited

U.S. PATENT DOCUMENTS

| | | | |
|---|---|---|---|
| 3,980,625 A * | 9/1976 | Sakamoto et al. | 526/67 |
| 4,471,093 A | 9/1984 | Furukawa et al. | |
| 4,866,131 A | 9/1989 | Fujimaki et al. | |
| 5,508,336 A | 4/1996 | Takeichi et al. | |
| 5,780,537 A * | 7/1998 | Smith et al. | 524/493 |
| 6,376,587 B1 * | 4/2002 | Ajiro et al. | 524/252 |
| 6,426,378 B1 * | 7/2002 | Lickes et al. | 524/262 |
| 6,455,655 B1 * | 9/2002 | Colvin et al. | 526/329.2 |
| 7,472,732 B2 * | 1/2009 | Otsuji et al. | 152/454 |
| 8,044,131 B2 * | 10/2011 | Hirayama et al. | 524/493 |
| 2005/0119399 A1 * | 6/2005 | Nishioka et al. | 524/502 |

FOREIGN PATENT DOCUMENTS

| | | |
|---|---|---|
| EP | 0502728 A1 | 9/1992 |
| EP | 0942042 A2 | 9/1999 |
| EP | 1241203 A2 | 9/2002 |
| EP | 1253170 A1 | 10/2002 |
| EP | 1535959 A2 | 6/2005 |
| JP | 8-73657 A | 3/1996 |
| JP | 2000-289407 A | 10/2000 |
| JP | 2001-49034 A | 2/2001 |
| JP | 2002-60549 A | 2/2002 |
| JP | 2002-161170 A | 6/2002 |
| JP | 2002-179844 A | 6/2002 |
| JP | 2002-212345 A | 7/2002 |
| JP | 2002-322317 A | 11/2002 |
| JP | 2004-51798 A | 2/2004 |
| JP | 2005-146115 A | 6/2005 |
| WO | 96/16118 A1 | 5/1996 |
| WO | 2004024813 A1 | 3/2004 |

OTHER PUBLICATIONS

Machine translation of Sumimoto Rubber Industries, JP 2005-146115 A.*
Sun et al., "Butadiene", Kirk-Othmer Encyclopedia of Chemical Technology, 2001, pp. 365-392.*
Notification of Reasons for Refusal from the Japanese Patent Office, issued on Aug. 30, 2011 in counterpart Japanese Patent Application No. 2007-508035 (with English translation).
Official Decision of Refusal, drafted Nov. 25, 2011, as received from the Japanese Patent Office in counterpart Japanese Patent Application No. 2007-508035, along with an English translation thereof.

* cited by examiner

*Primary Examiner* — Nicole M Buie-Hatcher
(74) *Attorney, Agent, or Firm* — Sughrue Mion, PLLC

(57) ABSTRACT

This invention relates to a rubber composition capable of improving a steering stability on a wet road and a low fuel consumption of a tire, and more particularly to a rubber composition comprising 5 to 60 parts by mass of a low-molecular weight aromatic vinyl compound-conjugated diene compound copolymer (B) having an aromatic vinyl compound content of 5 to 80% by mass, a vinyl bond content in a conjugated diene compound portion of 10 to 80% by mass and a weight average molecular weight as measured through a gel permeation chromatography and converted to polystyrene of 5,000 to 200,000 and 20 to 90 parts by mass of a filler (C) based on 100 parts by mass of a rubber component (A) composed of at least one of natural rubber and synthetic diene-based rubbers, in which 50 to 90% by mass of the filler (C) is silica.

6 Claims, No Drawings

RUBBER COMPOSITION AND PNEUMATIC TIRE USING THE SAME

TECHNICAL FIELD

This invention relates to a rubber composition and a pneumatic tire using the rubber composition in at least a ground-contacting part of a tread portion, and more particularly to a rubber composition for a tread capable of improving a steering stability on a wet road and a low fuel consumption of a tire.

BACKGROUND ART

Lately, it is strongly demanded to reduce a fuel consumption of an automobile in connection with a worldwide effluent control of carbon dioxide associated with a growing interest in environmental problems. In order to cope with such a demand, it is demanded to reduce a rolling resistance as a tire performance. As a means for reducing the rolling resistance of the tire, it is effective to use a rubber composition having a smaller loss tangent (tan $\delta$) and a low heat buildup as a rubber composition applied to a tread portion of the tire.

On the other hand, it is known that a heat buildup of a rubber composition is lowered by substituting the whole or a part of carbon black in the rubber composition using carbon black as a filler with silica, and the rolling resistance of the tire is reduced and the low fuel consumption is improved by using such a silica-containing rubber composition in the tread portion of the tire. Also, it is known that the steering stability on the wet road is simultaneously improved with the improvement of the low fuel consumption when the silica-containing rubber composition is used in the tread portion of the tire. Therefore, it is presumed that the steering stability on the wet road and low fuel consumption of the tire can be highly improved by using in the tread portion of the tire the rubber composition wherein the amount of silica compounded is increased.

However, when the amount of silica compounded is highly increased in the rubber composition, there is a problem that it is difficult to highly disperse the silica into the rubber component and the loss tangent (tan $\delta$) of the rubber composition cannot be sufficiently lowered due to the poor dispersion of silica. Also, since the dispersibility of silica as a filler is bad, there is a problem that the resulting rubber composition is insufficient in the fracture characteristics. Therefore, there is now required a technique capable of sufficiently ensuring the dispersibility of silica into the rubber component even if the amount of silica compounded is large.

DISCLOSURE OF THE INVENTION

It is, therefore, an object of the invention to improve the dispersibility of silica into the rubber component in the rubber composition compounded with the large amount of silica and to provide a rubber composition capable of improving a steering stability on a wet road and a low fuel consumption of a tire. Also, it is another object of the invention to provide a pneumatic tire using such a rubber composition in at least a ground-contacting part of a tread portion and being excellent in the steering stability on the wet road and low fuel consumption.

The inventor has made various studies in order to achieve the above objects and discovered that a milling efficiency in the milling of the rubber composition can be improved to highly disperse silica by using a liquid low-molecular weight aromatic vinyl compound-conjugated diene compound copolymer having specified aromatic vinyl compound content, vinyl bond content and weight average molecular weight instead of a commonly used softening agent such as aromatic oil or the like in the rubber composition comprising the large amount of silica as a filler, and hence the loss tangent (tan $\delta$) can be considerably lowered without deteriorating the fracture characteristics of the rubber composition, and further the steering stability on the wet road and low fuel consumption of the tire can be highly improved by using the resulting rubber composition in at least a ground-contacting part of the tread portion, and as a result the invention has been accomplished.

That is, the rubber composition according to the invention comprises 5 to 60 parts by mass of a low-molecular weight aromatic vinyl compound-conjugated diene compound copolymer (B) having an aromatic vinyl compound content of 5 to 80% by mass, a vinyl bond content in a conjugated diene compound portion of 10 to 80% by mass and a weight average molecular weight as measured through a gel permeation chromatography and converted to polystyrene of 5,000 to 200,000 and 20 to 90 parts by mass of a filler (C) based on 100 parts by mass of a rubber component (A) composed of at least one of natural rubber and synthetic diene-based rubbers, in which 50 to 90% by mass of the filler (C) is silica.

The rubber composition according to the invention is preferable to further contain 5 to 15% by mass of a silane coupling agent (D) based on the amount of silica compounded. In this case, the low heat buildup and wet performance of the rubber composition can be further improved.

In a preferable embodiment of the rubber composition according to the invention, not less than 50% by mass of the rubber component (A) is styrene-butadiene copolymer rubber (SBR).

In another preferable embodiment of the rubber composition according to the invention, the aromatic vinyl compound in the low-molecular weight aromatic vinyl compound-conjugated diene compound copolymer (B) is styrene.

In the other preferable embodiment of the rubber composition according to the invention, the conjugated diene compound in the low-molecular weight aromatic vinyl compound-conjugated diene compound copolymer (B) is 1,3-butadiene.

In the rubber composition according to the invention, the low-molecular weight aromatic vinyl compound-conjugated diene compound copolymer (B) may be an unmodified low-molecular weight aromatic vinyl compound-conjugated diene compound copolymer or a modified low-molecular weight aromatic vinyl compound-conjugated diene compound copolymer having at least one functional group. When the low-molecular weight aromatic vinyl compound-conjugated diene compound copolymer (B) is the unmodified low-molecular weight aromatic vinyl compound-conjugated diene compound copolymer, it preferably has a weight average molecular weight as measured through a gel permeation chromatography and converted to polystyrene of 20,000 to 150,000, more preferably 50,000 to 150,000. Also, when the low-molecular weight aromatic vinyl compound-conjugated diene compound copolymer (B) is the modified low-molecular weight aromatic vinyl compound-conjugated diene compound copolymer having at least one functional group, it preferably has a weight average molecular weight as measured through a gel permeation chromatography prior to a modification and converted to polystyrene of 5,000 to 200,000.

Also, the pneumatic tire according to the invention is characterized by using the above rubber composition in at least a ground-contacting part of a tread portion.

According to the invention, there can be provided a rubber composition using a liquid low-molecular weight aromatic vinyl compound-conjugated diene compound copolymer having specified aromatic vinyl compound content, vinyl bond content and weight average molecular weight and being capable of improving a steering stability on a wet road and a low fuel consumption of a tire. Also, there can be provided a pneumatic tire using such a rubber composition in at least a ground-contacting part of a tread portion and being excellent in the steering stability on a wet road and low fuel consumption.

BEST MODE FOR CARRYING OUT THE INVENTION

The invention will be described in detail below. The rubber composition according to the invention comprises 5 to 60 parts by mass of a low-molecular weight aromatic vinyl compound-conjugated diene compound copolymer (B) having an aromatic vinyl compound content of 5 to 80% by mass, a vinyl bond content in a conjugated diene compound portion of 10 to 80% by mass and a weight average molecular weight as measured through a gel permeation chromatography and converted to polystyrene of 5,000 to 200,000 and 20 to 90 parts by mass of a filler (C) based on 100 parts by mass of a rubber component (A) composed of at least one of natural rubber and synthetic diene-based rubbers, in which 50 to 90% by mass of the filler (C) is silica.

In the rubber composition according to the invention, the low-molecular weight aromatic vinyl compound-conjugated diene compound copolymer (B) improves the milling efficiency in the milling of the rubber composition and the dispersibility of silica compounded as the filler (C) into the rubber component (A). Therefore, the rubber composition according to the invention is excellent in the low heat buildup and wet performance because the compounding effect of silica is sufficiently developed. Also, since the dispersibility of silica is good, the rubber composition according to the invention has sufficient fracture characteristics. Moreover, the steering stability on the wet road and low fuel consumption of the tire can be highly improved while sufficiently ensuring the fracture characteristics of the tire by using the rubber composition in at least a ground-contacting part of the tread portion.

The rubber component (A) in the rubber composition according to the invention is composed of at least one of natural rubber (NR) and synthetic diene-based rubbers. As the synthetic diene-based rubber is preferable one synthesized through emulsion polymerization or solution polymerization. As the synthetic diene-based rubber are concretely mentioned polyisoprene rubber (IR), styrene-butadiene copolymer rubber (SBR), polybutadiene rubber (BR), ethylene-propylene-diene rubber (EPDM), chloroprene rubber (CR), halogenated butyl rubber, acrylonitrile-butadiene rubber (NBR) and so on. Natural rubber, polyisoprene rubber, styrene-butadiene copolymer rubber and polybutadiene rubber are preferable as the rubber component (A) and it is more preferable that not less than 50% by mass of the rubber component (A) is styrene-butadiene copolymer rubber. When not less than 50% by mass of the rubber component (A) is styrene-butadiene copolymer rubber, the effect obtained by compounding the low-molecular weight aromatic vinyl compound-conjugated diene compound copolymer (B) becomes remarkable. These rubber components may be used alone or in a blend of two or more. Moreover, from a viewpoint of the wear resistance and heat resistance of the rubber composition, as the rubber component (A) is preferable one having a glass transition point (Tg) of not lower than −60° C.

The rubber composition according to the invention comprises 5 to 60 parts by mass of the low-molecular weight aromatic vinyl compound-conjugated diene compound copolymer (B) having an aromatic vinyl compound content of 5 to 80% by mass, a vinyl bond content in a conjugated diene compound portion of 10 to 80% by mass and a weight average molecular weight as measured through a gel permeation chromatography and converted to polystyrene of 5,000 to 200,000 based on 100 parts by mass of the rubber component (A). When the amount of the low-molecular weight aromatic vinyl compound-conjugated diene compound copolymer (B) compounded is less than 5 parts by mass, the workability of the rubber composition is deteriorated, while when it exceeds 60 parts by mass, the fracture characteristics of the vulcanized rubber tend to be deteriorated.

The low-molecular weight aromatic vinyl compound-conjugated diene compound copolymer (B) is required to have an aromatic vinyl compound content of 5 to 80% by mass. When the bound aromatic vinyl compound content is less than 5% by mass or exceeds 80% by mass, the low heat buildup and wet performance of the rubber composition cannot be sufficiently and simultaneously established.

Also, the low-molecular weight aromatic vinyl compound-conjugated diene compound copolymer (B) is required to have a vinyl bond content in a conjugated diene compound portion of 10 to 80% by mass. When the vinyl bond content in the conjugated diene compound portion is less than 10% by mass or exceeds 80% by mass, the low heat buildup and wet performance of the rubber composition cannot be sufficiently and simultaneously established.

Moreover, the low-molecular weight aromatic vinyl compound-conjugated diene compound copolymer (B) is required to have a weight average molecular weight as converted to polystyrene of 5,000 to 200,000. When the weight average molecular weight is less than 5,000, the loss tangent (tan δ) of the rubber composition tends to rise to deteriorate the low heat buildup, while when it exceeds 200,000, the workability of the rubber composition is deteriorated.

The low-molecular weight aromatic vinyl compound-conjugated diene compound copolymer (B) may be an unmodified low-molecular weight aromatic vinyl compound-conjugated diene compound copolymer or a modified low-molecular weight aromatic vinyl compound-conjugated diene compound copolymer having at least one functional group. Moreover, the modified low-molecular weight aromatic vinyl compound-conjugated diene compound copolymer is preferable to be one wherein at least one terminal is modified with a tin-containing compound or a silicon-containing compound.

The unmodified low-molecular weight aromatic vinyl compound-conjugated diene compound copolymer preferably has a weight average molecular weight as converted to polystyrene of 20,000 to 150,000, more preferably 50,000 to 150,000. When the weight average molecular weight is within the range, the degradation of the workability in the milling can be surely prevented while further improving the low heat buildup of the rubber composition.

Also, the modified low-molecular weight aromatic vinyl compound-conjugated diene compound copolymer preferably has a weight average molecular weight as converted to polystyrene prior to the modification of 5,000 to 200,000, more preferably 20,000 to 150,000, even more preferably 50,000 to 150,000. When the weight average molecular weight prior to the modification is within the range, the degradation of the workability can be surely prevented while further improving the low heat buildup of the rubber composition.

The low-molecular weight aromatic vinyl compound-conjugated diene compound copolymer is obtained by copolymerizing an aromatic vinyl compound and a conjugated diene compound as a monomer with a polymerization initiator. As the aromatic vinyl compound are mentioned styrene, p-methyl styrene, m-methyl styrene, p-tert-butyl styrene, α-methyl styrene, chloromethyl styrene, vinyl toluene and so on. Among them, styrene is preferable. On the other hand, as the conjugated diene compound are mentioned 1,3-butadiene, isoprene, 1,3-pentadiene, 2,3-dimethylbutadiene and so on. Among them, 1,3-butadiene is preferable. Moreover, as the polymerization initiator is preferable an organolithium compound, and a hydrocarbyl lithium and a lithium amide compound are more preferable. When the organolithium compound is used as the polymerization initiator, the aromatic vinyl compound and conjugated diene compound are copolymerized through anionic polymerization. The amount of the polymerization initiator used is preferably within a range of 0.2 to 20 mmol per 100 g of the monomer.

The preferable hydrocarbyl lithium as the polymerization initiator includes ethyllithium, n-propyllithium, isopropyllithium, n-butyllithium, sec-butyllithium, tert-octyllithium, n-decyllithium, phenyllithium, 2-naphthyl lithium, 2-butylphenyl lithium, 4-phenyl-butyl lithium, cyclohexyl lithium, cyclopentyl lithium, a reaction product of diisopropenylbenzene and butyllithium and so on. Among them, alkyllithiums such as ethyllithium, n-propyllithium, isopropyllithium, n-butyllithium, sec-butyllithium, tert-octyllithium, n-decyllithium and so on are preferable, and n-butyllithium is particularly preferable.

Also, the preferable lithium amide compound as the polymerization initiator includes lithium hexamethylene imide, lithium pyrrolidide, lithium piperidide, lithium heptamethylene imide, lithium dodecamethylene imide, lithium dimethyl amide, lithium diethyl amide, lithium dipropyl amide, lithium dibutyl amide, lithium dihexyl amide, lithium diheptyl amide, lithium dioctyl amide, lithium di-2-ethylhexyl amide, lithium didecyl amide, lithium-N-methyl piperazide, lithium ethyl propyl amide, lithium ethyl butyl amide, lithium methyl butyl amide, lithium ethyl benzyl amide, lithium methyl phenethyl amide and so on. Among them, cyclic lithium amide compounds such as lithium hexamethylene imide, lithium pyrrolidide, lithium piperidide, lithium heptamethylene imide, lithium dodecamethylene imide and so on are preferable, and lithium hexamethylene imide and lithium pyrrolidide are particularly preferable.

The method for producing the aromatic vinyl compound-conjugated diene compound copolymer with the above polymerization initiator is not particularly limited. For example, the copolymer can be produced by polymerizing a mixture of the conjugated diene compound and aromatic vinyl compound in a hydrocarbon solvent inactive to the polymerization reaction. As the hydrocarbon solvent inactive to the polymerization reaction are mentioned propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and so on. They may be used alone or in a combination of two or more.

The polymerization reaction may be carried out in the presence of a randomizer. The randomizer can control the microstructure of the conjugated diene compound portion in the copolymer, and more concretely has an action that the vinyl bond content of the conjugated diene compound portion in the copolymer is controlled, the conjugated diene compound unit and aromatic vinyl compound unit in the copolymer are randomized, or the like. As the randomizer are mentioned dimethoxybenzene, tetrahydrofuran, dimethoxyethane, diethylene glycol dibutyl ether, diethylene glycol dimethyl ether, bistetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 mol per 1 mol of the polymerization initiator used for producing the copolymer.

The polymerization reaction is preferably carried out through solution polymerization. The concentration of the monomer in the polymerization reaction solution is preferably within a range of 5 to 50% by mass, more preferably 10 to 30% by mass. Moreover, the content of the aromatic vinyl compound in the mixture of the conjugated diene compound and aromatic vinyl compound is preferably within a range of 5 to 80% by mass, and can be properly selected depending on the aromatic vinyl compound content of the target copolymer (B). Also, the polymerization system is not particularly limited and may be a batch system or a continuous system.

The polymerization temperature in the polymerization reaction is preferably within a range of 0 to 150° C., more preferably 20 to 130° C. Also, the polymerization may be carried out under a generating pressure, but it is preferable to be usually conducted under a pressure enough to keep the monomers used at substantially a liquid phase. When the polymerization reaction is carried out under a pressure higher than the generating pressure, the reaction system is preferable to be pressurized with an inert gas. Moreover, the starting materials used in the polymerization such as monomers, polymerization initiator, solvent and the like are preferable to be used after the reaction obstructing substances such as water, oxygen, carbon dioxide, protonic compound and the like are previously removed.

Also, the modified low-molecular weight aromatic vinyl compound-conjugated diene compound copolymer can be obtained through (1) a method comprising copolymerizing the aromatic vinyl compound and conjugated diene compound as the monomer with the polymerization initiator to produce an aromatic vinyl compound-conjugated diene compound copolymer having a polymerization active site and then modifying the polymerization active site with various modifying agents, or (2) a method comprising copolymerizing the aromatic vinyl compound and conjugated diene compound as the monomer with a polymerization initiator having a functional group. When the hydrocarbyl lithium is used as the polymerization initiator, the copolymer having a hydrocarbyl group at a polymerization starting terminal and a polymerization active site at another terminal can be obtained. Also, when the lithium amide compound is used as the polymerization initiator, the copolymer having a nitrogen-containing functional group at a polymerization starting terminal and a polymerization active site at another terminal can be obtained, which has at least one functional group even if it is not modified with the modifying agent.

When the polymerization active site in the copolymer having the polymerization active site is modified with the modifying agent, as the modifying agent to be used are preferable tin-containing compounds and silicon-containing compounds. As the modifying agent is preferable a coupling agent represented by the following formula (I):

(I)

[wherein $R^1$ is independently selected from the group consisting of an alkyl group having a carbon number of 1-20, a cycloalkyl group having a carbon number of 3-20, an aryl group having a carbon number of 6-20 and an aralkyl group having a carbon number of 7-20; Z is tin or silicon; X is independently chlorine or bromine; and a is 0-3 and b is 1-4 provided that a+b=4]. The cold flow resistance of the copolymer (B) can be improved by modifying with the coupling agent of the formula (I). Moreover, the copolymer (B) obtained by modifying with the coupling agent of the formula (I) has at least one of tin-carbon bond and silicon-carbon bond.

As $R^1$ in the formula (I) are concretely mentioned methyl group, ethyl group, n-butyl group, neophyl group, cyclohexyl group, n-octyl group, 2-ethylhexyl group and the like. Moreover, as the coupling agent of the formula (I) are concretely preferable $SnCl_4$, $R^1SnCl_3$, $R^1{}_2SnCl_2$, $R^1{}_3SnCl$, $SiCl_4$, $R^1SiCl_3$, $R^1{}_2SiCl_2$, $R^1{}_3SiCl$ and the like, and $SnCl_4$ and $SiCl_4$ are particularly preferable.

Also, as the silicon-containing compound usable as the modifying agent are preferable a hydrocarbyloxy silane compound represented by the following formula (II):

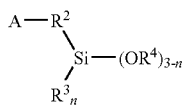

(II)

[wherein A is a monovalent group having at least one functional group selected from (thio)epoxy, (thio)isocyanate, (thio)ketone, (thio)aldehyde, imine, amide, isocyanuric acid triester, (thio)carboxylic acid hydrocarbylester, a metal salt of (thio)carboxylic acid, carboxylic anhydride, a halide of carboxylic acid, carbonic acid dihydrocarbylester, cyclic tertiary amine, acyclic tertiary amine, nitrile, pyridine, sulfide and multi-sulfide; $R^2$ is a single bond or a bivalent inactive hydrocarbon group; $R^3$ and $R^4$ are independently a monovalent aliphatic hydrocarbon group having a carbon number of 1-20 or a monovalent aromatic hydrocarbon group having a carbon number of 6-18; n is an integer of 0-2; when plural $OR^4$s are existent, they may be same or different; and active proton and onium salt are not included in the molecule] and a partial condensate thereof, as well as a hydrocarbyloxy silane compound represented by the following formula (III):

(III)

(wherein $R^5$ and $R^6$ are independently a monovalent aliphatic hydrocarbon group having a carbon number of 1-20 or a monovalent aromatic hydrocarbon group having a carbon number of 6-18; p is an integer of 0-2; when plural $OR^6$s are existent, they may be same or different; and active proton and onium salt are not included in the molecule) and a partial condensate thereof.

In the functional group of A of the formula (II), imine includes ketimine, aldimine and amidine, and (thio)carboxylic acid ester includes an ester of an unsaturated carboxylic acid such as acrylate, methacrylate or the like, and acyclic tertiary amine includes N,N-disubstituted aromatic amine such as N,N-disubstituted aniline or the like, and cyclic tertiary amine can include (thio)ether as a part of a ring. As a metal of a metal salt of (thio)carboxylic acid can be mentioned an alkali metal, an alkaline earth metal, Al, Sn, Zn and the like.

As the bivalent inert hydrocarbon group in $R^2$ is preferable an alkylene group having a carbon number of 1-20. The alkylene group may be straight, branched or cyclic, but the straight chain is particularly preferable. As the straight alkylene group are mentioned methylene group, ethylene group, trimethylene group, tetramethylene group, pentamethylene group, hexamethylene group, octamethylene group, decamethylene group, dodecamethylene group and the like.

As $R^3$ and $R^4$ are mentioned an alkyl group having a carbon number of 1-20, an alkenyl group having a carbon number of 2-18, an aryl group having a carbon number of 6-18, an aralkyl group having a carbon number of 7-18 and the like. In this case, the alkyl group and alkenyl group may be straight, branched or cyclic, and include, for example, methyl group, ethyl group, n-propyl group, isopropyl group, n-butyl group, isobutyl group, sec-butyl group, tert-butyl group, pentyl group, hexyl group, octyl group, decyl group, dodecyl group, cyclopentyl group, cyclohexyl group, vinyl group, propenyl group, allyl group, hexenyl group, octenyl group, cyclopentenyl group, cyclohexenyl group and the like. Also, the aryl group may have a substituent on the aromatic ring such as lower alkyl group or the like, and includes, for example, phenyl group, tolyl group, xylyl group, naphthyl group and the like. Further, the aralkyl group may have a substituent on the aromatic ring such as lower alkyl group or the like, and includes, for example, benzyl group, phenetyl group, naphthylmethyl group and the like.

In the formula (II), n is an integer of 0-2 and preferably 0. Moreover, it is required that active proton and onium salt are not included in the molecule.

In the hydrocarbyloxy silane compound represented by the formula (II), as the (thio)epoxy group-containing hydrocarbyloxysilane compound may be mentioned, for example, 2-glycidoxyethyl trimethoxysilane, 2-glycidoxyethyl triethoxysilane, (2-glycidoxyethyl)methyl dimethoxysilane, 3-glycidoxypropyl trimethoxysilane, 3-glycidoxypropyl triethoxysilane, (3-glycidoxypropyl)methyl dimethoxysilane, 2-(3,4-epoxycyclohexyl)ethyl trimethoxysilane, 2-(3,4-epoxycyclohexyl)ethyl triethoxysilane, 2-(3,4-epoxycyclohexyl)ethyl (methyl dimethoxysilane and ones obtained by replacing the epoxy group in these compounds with a thioepoxy group. Among them, 3-glycidoxypropyl trimethoxysilane and 3-glycidoxypropyl triethoxysilane are particularly preferable.

As the imine group-containing hydrocarbyloxy silane compound may be mentioned N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine as well as trimethoxysilyl compounds, methyldiethoxysilyl compounds, ethyldiethoxysilyl compounds, methyldimethoxysilyl compounds, ethyldimethoxysilyl compounds and the like corresponding to these triethoxysilyl compounds. Among them, N-(1-methylpropylidene)-3-(triethoxysilyl)-1-propaneamine and N-(1,3-dimethylbutylidene)-3-(triethoxysilyl)-1-propaneamine are particularly preferable.

As the imine(amidine) group-containing compound are mentioned 1-[3-(triethoxysilyl)propyl]-4,5-dihydroimidazole, 1-[3-(trimethoxysilyl)propyl]-4,5-dihydroimidazole, N-(3-triethoxysilylpropyl)-4,5-dihydroimidazole, N-(3-isopropoxysilylpropyl)-4,5-dihydroimidazole, N-(3-methyldiethoxysilylpropyl)-4,5-dihydroimidazole and the like. Among them, N-(3-triethoxysilylpropyl)-4,5-dihydroimidazole is preferable.

As the carboxylic acid ester group-containing compound are mentioned 3-methacryloyloxypropyl triethoxysilane, 3-methacryloyloxypropyl trimethoxysilane, 3-methacryloyloxypropyl methyldiethoxysilane, 3-methacryloyloxypropyl triisopropoxysilane and the like. Among them, 3-methacryloyloxypropyl trimethoxysilane is preferable.

As the isocyanate group-containing compound are mentioned 3-isocyanatopropyl trimethoxysilane, 3-isocyanatopropyl triethoxysilane, 3-isocyanatopropyl methyldiethoxysilane, 3-isocyanatopropyl triisopropoxysialne and the like. Among them, 3-isocyanatopropyl triethoxysilane is preferable.

As the carboxylic anhydride-containing compound are mentioned 3-triethoxysilylpropyl succinic anhydride, 3-trimethoxysilylpropyl succinic anhydride, 3-methyldiethoxysilylpropyl succinic anhydride and the like. Among them, 3-triethoxysilylpropyl succinic anhydride is preferable.

As the cyclic tertiary amine group-containing hydrocarbyloxysilane compound are mentioned 3-(1-hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-pyrrolidynyl)propyl(triethoxy)silane, 3-(1-pyrrolidynyl)propyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, 3-(1-hexamethyleneimino)propyl(diethoxy)ethylsilane, 3-[10-(triethoxysilyl)decyl]-4-oxazoline and the like. Among them, 3-(1-hexamethyleneimino)propyl(triethoxy)silane and (1-hexamethyleneimino)methyl(trimethoxy)silane are preferable.

As the acyclic tertiary amine group-containing hydrocarbyloxysilane compound are mentioned 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl(triethoxy)silane and the like. Among them, 3-diethylaminopropyl(triethoxy)silane and 3-dimethylaminopropyl(triethoxy)silane are preferable.

As the other hydrocarbyloxysilane compound are mentioned 2-(trimethoxysilylethyl)pyridine, 2-(triethoxysilylethyl)pyridine, 2-cyanoethyltriethoxy silane and the like.

The hydrocarbyloxysilane compounds of the formula (II) may be used alone or in a combination of two or more. Also, a partial condensate of the hydrocarbyloxysilane compound may be used.

In the formula (III), $R^5$ and $R^6$ are the same as mentioned on $R^3$ and $R^4$ of the formula (II), respectively.

As the hydrocarbyloxysilane compound represented by the formula (III) are mentioned, for example, tetramethoxy silane, tetraethoxy silane, tetra-n-propoxy silane, tetraisopropoxy silane, tetra-n-butoxy silane, tetraisobutoxy silane, tetra-sec-butoxy silane, tetra-tert-butoxy silane, methyltrimethoxy silane, methyltriethoxy silane, methyltripropoxy silane, methyltriisopropoxy silane, ethyltrimethoxy silane, ethyltriethoxy silane, propyltriethoxy silane, butyltrimethoxy silane, phenyltrimethoxy silane, phenyltriethoxy silane, dimethyldimethoxy silane, methylphenyldimethoxy silane, vinyltrimethoxy silane, vinyltriethoxy silane, divinyldimethoxy silane, divinyldiethoxy silane and the like. Among them, tetraethoxy silane is particularly preferable.

The hydrocarbyloxysilane compounds of the formula (III) may be used alone or in a combination of two or more. Also, a partial condensate of the hydrocarbyloxysialne compound may be used.

The modification reaction of the polymerization active site with the above modifying agent is preferable to be carried out by a solution reaction. Such a solution may include the monomer used in the polymerization. Also, the reaction system of the modification reaction is not particularly limited, and may be a batch system or a continuous system. Further, the reaction temperature of the modification reaction is not particularly limited as long as the reaction proceeds, and the reaction temperature in the polymerization reaction may be adopted as it is. The amount of the modifying agent used is preferably within a range of 0.25 to 3.0 mol, more preferably 0.5 to 1.5 mol per 1 mol of the polymerization initiator used for producing the copolymer.

In the invention, the reaction solution containing the copolymer (B) may be dried to separate the copolymer (B) and then the resulting copolymer (B) may be compounded into the rubber component (A), or the reaction solution containing the copolymer (B) may be mixed with a rubber cement of the rubber component (A) at a solution state and then dried to obtain the mixture of the rubber component (A) and the copolymer (B).

The rubber composition according to the invention comprises 20 to 90 parts by mass of the filler (C) based on 100 parts by mass of the rubber component (A), in which 50 to 90% by mass of the filler (C) is required to be silica. When the amount of the filler (C) compounded is less than 20 parts by mass, the fracture characteristics and wear resistance of the vulcanized rubber are insufficient, while when it exceeds 90 parts by mass, the workability is deteriorated. Also, when the ratio of the silica in the filler (C) is less than 50% by mass, the low heat buildup and wet performance of the rubber composition cannot be sufficiently improved, while when it exceeds 90% by mass, the workability is deteriorated. As the silica are mentioned, for example, precipitated silica (hydrous silicate), fumed silica (anhydrous silicate), calcium silicate, aluminum silicate and so on. Among them, the precipitated silica is preferable. Moreover, the rubber composition according to the invention contains other reinforcing fillers such as carbon black or the like as the filler (C) in addition to the silica.

The rubber composition according to the invention is preferable to further contain 5 to 15% by mass of a silane coupling agent (D) based on the amount of the silica compounded. When the silane coupling agent (D) is added to the rubber composition, the low heat buildup and wet performance of the rubber composition can be further improved. However, when the amount of the silane coupling agent (D) added is less than 5% by mass of the amount of the silica compounded, the addition effect cannot be sufficiently developed, while when it exceeds 15% by mass, the effect is saturated and the cost becomes high. As the silane coupling agent (D) are mentioned bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxy silane, 3-mercaptopropyltriethoxy silane, 2-mercaptoethyltrimethoxy silane, 2-mercaptoethyltriethoxy silane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthio carbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate mono sulfide, bis(3-diethoxymethylsilylpropyl)tetrasulfide, 3-mercaptopropyl dimethoxymethyl silane, dimethoxymethylsilylpropyl-N,N-dimethylthiocarbamoyl tetrasulfide, dimethoxymethylsilylpropyl benzothiazole tetrasulfide and the like. Among them, bis(3-triethoxysilylpropyl)tetrasulfide and 3-trimethoxysilylpropyl benzothiazole tetrasulfide are preferable. These silane coupling agents (D) may be used alone or in a combination of two or more.

In the rubber composition of the invention can be properly compounded additives usually used in the rubber industry such as a wax, stearic acid, zinc white, a vulcanization accelerator, a vulcanizing agent and the like within a scope of not damaging the object of the invention in addition to the above rubber component (A), the low-molecular weight aromatic vinyl compound-conjugated diene compound copolymer (B), the filler (C) and the silane coupling agent (D). As these additives can be preferably used commercially available ones. The rubber composition can be produced by compounding the rubber component (A) with the low-molecular weight copolymer (B) and the filler (C) containing the predetermined ratio of the silica, and, if necessary, the properly selected additives and milling, warming, extruding and so on.

The pneumatic tire according to the invention is characterized by using the above rubber composition in at least the ground-contacting part of the tread portion. The tire using the rubber composition in at least the ground-contacting part of the tread portion is excellent in the low fuel consumption and steering stability on the wet road. The pneumatic tire according to the invention is not particularly limited as long as the above rubber composition is used in at least the ground-contacting part of the tread portion, and can be produced by the usual method. Moreover, as a gas filled into the tire can be used usual air or air having a regulated partial oxygen pressure but also inert gases such as nitrogen, argon, helium and so on.

EXAMPLES

The following examples are given in illustration of the invention and are not intended as limitations thereof.

Production Example of Liquid SBR

A cyclohexane solution of butadiene (16%) and a cyclohexane solution of styrene (21%) are charged into a pressure glass vessel of 800 mL dried and purged with nitrogen so as to be 40 g of butadiene monomer and 10 g of styrene monomer, and 0.66 mmol of 2,2-ditetrahydrofuryl propane is charged and 1.32 mmol of n-butyl lithium (BuLi) is added thereto, and then polymerization is conducted in a warmed water bath at 50° C. for 1.5 hours. The conversion is approximately 100%. Thereafter, 0.5 mL of a solution containing 5% by weight of 2,6-di-t-butyl-p-cresol (BHT) in isopropanol is added to the polymerization system to stop the reaction. Then, it is dried according to a usual manner to obtain a liquid SBR.

As the weight average molecular weight (Mw) is measured through a gel permeation chromatography [GPC: HLC-8020 manufactured by TOSOH, column: GMH-XL manufactured by TOSOH (series of two columns), detector: differential refractometer (RI)] based on a monodisperse polystyrene standard, the resulting liquid SBR has a weight average molecular weight as converted to polystyrene of 80,000. Also, as the microstructure is determined by an infrared method (Morello method) and the bound styrene content is determined from an integral ratio of $^1$H-NMR spectrum, the resulting liquid SBR has a bound styrene content of 25% by mass and a vinyl bond content in a butadiene portion of 65% by mass.

Then, a rubber composition having a compounding recipe as shown in Table 1 is prepared according to a usual method and a tire for passenger car having a tire size of 195/65R15 is prepared by using the thus obtained rubber composition in the tread portion. Further, with respect to the thus obtained tire, the steering stability on the wet road and low fuel consumption are evaluated according to the following methods. Results are shown in Table 1.

(1) Steering Stability on the Wet Road

Four tires to be tested are mounted onto a vehicle and actually run on a wet road, during which the steering stability is evaluated by a feeling of a driver, and is shown by an index on the basis that the steering stability of the tire in Comparative Example 1 is 100. The larger the index value, the higher and better the steering stability on the wet road.

(2) Low Fuel Consumption

A drum is rotated while contacting with the tire and raised up to a certain speed, and then a driving switch is turned off to freely rotate the drum, whereby the rolling resistance is determined from a degree of deceleration and represented by an index on the basis that an inverse of the rolling resistance of the tire in Comparative Example 1 is 100. The larger the index value, the smaller the rolling resistance and the more excellent the low fuel consumption.

TABLE 1

| | | | Comparative Example 1 | Comparative Example 2 | Comparative Example 3 | Comparative Example 4 | Comparative Example 5 | Example 1 | Example 2 | Example 3 |
|---|---|---|---|---|---|---|---|---|---|---|
| Formulation | SBR *1 | parts by mass | 100 | 100 | 100 | 100 | 100 | 100 | 100 | 100 |
| | Liquid SBR *2 | | — | — | — | — | 20 | 20 | 30 | 20 |
| | Aromatic oil | | 20 | 20 | 20 | 20 | — | — | — | — |
| | Carbon black *3 | | 20 | 40 | 10 | 60 | 60 | 20 | 20 | 40 |
| | Silica *4 | | 60 | 40 | 70 | 20 | 20 | 60 | 60 | 40 |
| | Stearic acid | | 2 | 2 | 2 | 2 | 2 | 2 | 2 | 2 |
| | Wax | | 2 | 2 | 2 | 2 | 2 | 2 | 2 | 2 |
| | Zinc white | | 3 | 3 | 3 | 3 | 3 | 3 | 3 | 3 |
| | Vulcanization accelerator CZ *5 | | 1.5 | 1.5 | 1.5 | 1.5 | 1.5 | 1.5 | 1.5 | 1.5 |
| | Vulcanization accelerator DPG *6 | | 1.5 | 1.5 | 1.5 | 1.5 | 1.5 | 1.5 | 1.5 | 1.5 |
| | Sulfur | | 1.7 | 1.7 | 1.7 | 1.7 | 1.7 | 1.7 | 1.7 | 1.7 |
| | Silane coupling agent *7 | | 6 | 4 | 7 | 2 | 2 | 6 | 6 | 4 |

TABLE 1-continued

|  |  |  | Comparative Example 1 | Comparative Example 2 | Comparative Example 3 | Comparative Example 4 | Comparative Example 5 | Example 1 | Example 2 | Example 3 |
|---|---|---|---|---|---|---|---|---|---|---|
|  | Ratio of silica in the filler | mass % | 75 | 50 | 87.5 | 25 | 25 | 75 | 75 | 50 |
| Evaluation results | Steering stability on the wet road | index | 100 | 97 | 101 | 95 | 95 | 100 | 98 | 100 |
|  | Low fuel consumption |  | 100 | 97 | 102 | 95 | 97 | 102 | 101 | 105 |

*1 #1500 manufactured by JSR Corporation.
*2 Liquid SBR produced in the above production example.
*3 SHOWBLACK N234 manufactured by Showa Cabot K.K.
*4 Nipsil AQ manufactured by Nippon Silica Industrial Co., Ltd.
*5 NOCCELER CZ manufactured by OUCHISHINKO CHEMICAL INDUSTRIAL CO., LTD., N-cyclohexyl-2-benzothiazolyl sulfenamide.
*6 NOCCELER D-P manufactured by OUCHISHINKO CHEMICAL INDUSTRIAL CO., LTD., 1,3-diphenyl guanidine.
*7 Si69 manufactured by Degussa, bis(3-triethoxysilypropyl) tetrasulfide.

As seen from Table 1, the steering stability on the wet road and low fuel consumption of the tire are improved as the ratio of the silica in the filler is increased. Also, as seen from a comparison of Comparative Example and Example having the same silica ratio (for example, a comparison of Comparative Example 1 and Example 1), the low fuel consumption can be improved while maintaining the steering stability on the wet road by replacing the aromatic oil with the liquid SBR.

The invention claimed is:

1. A rubber composition comprising 5 to 60 parts by mass of a low-molecular weight aromatic vinyl compound-conjugated diene compound copolymer (B) having an aromatic vinyl compound content of 5 to 80% by mass, a vinyl bond content in a conjugated diene compound portion of 10 to 80% by mass and a weight average molecular weight as measured through a gel permeation chromatography and converted to polystyrene of 20,000 to 150,000 and 20 to 90 parts by mass of a filler (C) based on 100 parts by mass of a rubber component (A) composed of at least one of natural rubber and/or synthetic diene-based rubbers, in which the filler (C) comprises silica and carbon black, and 50 to 90% by mass of the filler (C) is silica, which further contains 5 to 15% by mass of a silane coupling agent (D) based on the amount of the silica compounded, wherein the low-molecular weight aromatic vinyl compound-conjugated diene compound copolymer (B) is an unmodified low-molecular weight aromatic vinyl compound-conjugated diene compound copolymer produced by polymerizing a mixture of conjugated diene compound and aromatic vinyl compound in a hydrocarbon solvent.

2. A rubber composition according to claim 1, wherein not less than 50% by mass of the rubber component (A) is styrene-butadiene copolymer rubber.

3. A rubber composition according to claim 1, wherein the aromatic vinyl compound in the low-molecular weight aromatic vinyl compound-conjugated diene compound copolymer (B) is styrene.

4. A rubber composition according to claim 1, wherein the conjugated diene compound in the low-molecular weight aromatic vinyl compound-conjugated diene compound copolymer (B) is 1,3-butadiene.

5. A rubber composition according to claim 1, wherein the low-molecular weight aromatic vinyl compound-conjugated diene compound copolymer (B) is the unmodified low-molecular weight aromatic vinyl compound-conjugated diene compound copolymer and has a weight average molecular weight as measured through a gel permeation chromatography and converted to polystyrene of 50,000 to 150,000.

6. A pneumatic tire characterized by using a rubber composition as claimed in claim 1 in at least a ground-contacting part of a tread portion.

* * * * *